Feb. 15, 1944.  A. G. BADE  2,342,071
VARIABLE SPEED TRANSMISSION
Filed July 2, 1941
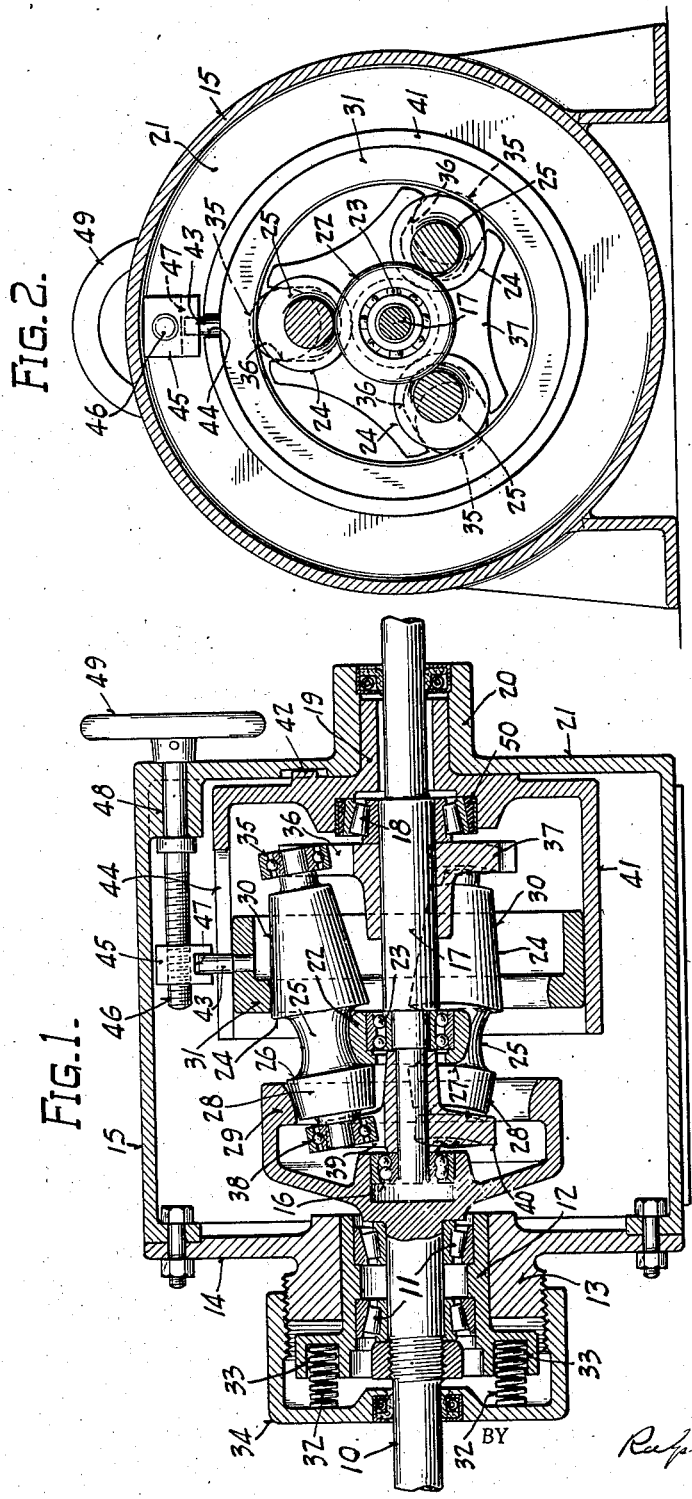
Alfred G. Bade
INVENTOR.
BY
ATTORNEY.

Patented Feb. 15, 1944

2,342,071

UNITED STATES PATENT OFFICE 2,342,071

VARIABLE SPEED TRANSMISSION

Alfred G. Bade, Wauwatosa, Wis., assignor to The Falk Corporation, Milwaukee, Wis., a corporation of Wisconsin Application July 2, 1941, Serial No. 400,726

11 Claims. (Cl. 74—281)

This invention relates to variable speed transmissions.

In my copending application, Serial No. 397,711, I have disclosed a gearless type of variable speed transmission involving a plurality of planet rollers each radially confined between a fulcrum support and two torque reactive rings, the fulcrum support coacting with the rollers and rings to maintain the required working pressures therebetween, and one of the rings being adjustable to regulate the planetary action of the rollers.

An object of the present invention is to simplify and improve the construction and operation of variable speed transmissions of that type.

In the transmission disclosed in said copending application the fulcrum support for each roller is in the form of an anti-friction bearing in which the roller is journalled and which travels in planetary fashion about the central axis of the device. The reverse loads to which these bearings are subjected together with the gyroscopic forces acting thereon present difficulties with which it is difficult to cope and which ordinarily materially shorten the life of the bearings. A more specific object of the present invention is to provide a transmission of this type in which those bearings may be eliminated.

Other more specific objects and advantages will appear from the following description of an illustrative embodiment of the present invention.

In the accompanying drawing:

Figure 1 is an axial sectional view of a variable speed transmission constructed in accordance with this invention.

Fig. 2 is a transverse sectional view.

The transmission selected for illustration includes a driven shaft 10 journalled in appropriate axially spaced bearings 11 in a cage 12 which is seated in a hub 13 carried by an end plate 14 removably attached to the forward end of a suitable housing 15. For purposes which will later appear, the cage 12 is axially movable in the hub 13 and the shaft 10 is axially movable, as a unit, therewith. The inner end of the driven shaft 10 is hollowed out to receive a self aligning bearing 16 constituting a support for the forward end of a drive shaft 17, the drive shaft being additionally supported by a bearing 18 seated in a cage 19 fixed in a hub 20 carried by the rear end wall 21 of the housing.

In this instance a ring 22, supported by a suitable anti-friction bearing 23 fixed to the drive shaft 17, constitutes a fulcrum support for a plurality of planet rollers 24 symmetrically arranged about the drive shaft. Three such rollers are shown, each having a groove 25 formed intermediate the ends thereof to receive the fulcrum ring 22. Each groove 25 has an end shoulder 26 which normally contacts an end face 27 of the ring 22 to accurately position the several rollers axially of the shaft 17.

Each roller shown is provided at one side of the groove 25 with a tapered section 28 in frictional rolling engagement with a driven ring 29, and is further provided at the other side of the groove 25 with a tapered section 30 in frictional rolling engagement with a non-rotating control ring 31. The inner faces of the rings 29 and 31 are preferably convexly curved to reduce the area of contact with each roller. The ring 29 is forced against the tapered section 28 by relative movement axially of the ring, and the pressure thus developed between the ring 29 and section 28 reacts through the fulcrum ring 22 to develop pressure between the tapered section 30 and the ring 31.

In this instance the taper of the section 28 is in such direction that the pressure between it and the ring 29 is produced by inward axial movement of the latter, suitable means being provided for urging the ring 29 in that direction. In the machine shown, this is effected by the use of a plurality of springs 32 seated in appropriate pockets 33 formed in the outer end of the cage 12 and reacting against a cup shaped member 34 in screw threaded engagement with the hub 13. It is of course understood that the shaft 10 and ring 29 are axially movable, as a unit, with the cage 12. The arrangement is such that the degree of compression in the springs 32 may be varied by rotation of the member 34 about the hub 13, so as to regulate the degree of thrust imposed by the springs 32 upon the cage 12, and thereby regulate the magnitude of pressure between the ring 29 and roller sections 28 and between the roller sections 30 and ring 31.

In the transmission shown the several rollers are uniformly inclined relative to the common axis of the shafts 10 and 17 and the degree and direction of taper of the sections 30 thereof is such that the outer sides of the sections extend substantially parallel to the shaft axis. The inclined axis of each roller is retained in a radial plane of the shafts by appropriate guides, and for that purpose each roller is provided at one end with an anti-friction bearing 35 closely guided in a radial slot 36 formed in a disk 37 fixed to the shaft 17, and at the opposite end each roller is similarly equipped with a bearing 38 closely guided in a radial slot 39 formed in a disk 40 fixed to the shaft 17. The disks 37 and 40 cause the rollers to revolve with the drive shaft 17.

The ring 31 is fixed against rotation and, by virtue of the frictional engagement thereof with the roller sections 30, the rollers revolve about their individual axes as they revolve with the drive shaft and, by virtue of the frictional engagement between the roller sections 28 and driven ring 29, the latter responds to the planetary action thus induced in the rollers. The rate and direction of rotation thus imparted to the driven ring 29 is regulated and controlled by adjustment of the control ring 31 lengthwise of the tapered roller sections 30, the rate of rotation of the rollers about their individual axes being dependent upon the length of the roller radius at the point of contact thereof with the control ring.

The control ring 31 may be mounted and controlled in various ways. In this instance it is held against rotation and against radial displacement. In the device shown the control ring is closely fitted for free axial movement within a cylindrical structure 41 which is carried by the inner end of the cage 19 and interlocked, as at 42, with the end wall 21 of the housing to prevent rotation of the cage and structure 41. The ring 31 is held against rotation by a pin 43 anchored therein and projecting radially through a slot 44 formed in and extending lengthwise of the structure 41. Axial adjustment of the ring 31 is effected and controlled in this instance by a nonrotating nut 45 threaded on a control screw 46 and having a transverse slot 47 in which the pin 43 is engaged. The control screw 46 is axially fixed and journalled, as at 48, in the end wall 21 of the housing and is equipped with a hand wheel 49 or other appropriate means of adjustment.

In transmissions of this type it is impossible to machine the parts with sufficient accuracy to insure absolute concentricity between the group of rollers and the rings 29 and 31 with which they engage, and this is a common cause of functional difficulties. Provision is therefore made to compensate for such errors. In the machine shown this is accomplished by providing a yieldable cushion 50 in the outer race of the bearing 18. The cushion 50 comprises an annular layer of rubber or like resilient material interposed between the inner and outer ring sections of the outer bearing race. By reason of this cushion the drive shaft 17 and the fulcrum ring 22 carried thereby are radially yieldable so as to permit the roller group to automatically center itself with respect to the rings 29 and 31. This slight radial freedom of the fulcrum ring 22 is sufficient to insure adequate pressures between it and all of the rollers and between the rollers and the rings 29 and 31, so long as the springs 32 maintain an adequate inward thrust upon the ring 29.

Various changes may be made in the embodiment of the invention hereinabove specifically described without departing from or sacrificing the advantages of the invention as defined in the appended claims.

I claim:

1. In a variable speed transmission the combination of two torque sustaining rings one rotatable relative to the other, an elongated roller having a tapered section in rolling engagement with one of said rings and another section in rolling engagement with the other of said rings, and a third ring in rolling engagement with said roller, said third ring providing a fulcrum for said roller coacting with said two first named rings to provide a three-point support for said roller and to maintain the required normal pressures between said roller and said torque sustaining rings, and means for effecting relative adjustment between said tapered section and the ring with which it engages to vary the relative rotation between said rings.

2. In a variable speed transmission the combination of an elongated roller revolvable in planetary fashion about an axis, three rings concentric with said axis and in rolling engagement with said roller at axially spaced points thereon to position the same and to maintain the required normal pressures between said roller and said rings, two of said rings comprising torque sustaining rings one rotatable relative to the other, the third of said rings comprising a fulcrum for said roller, and means for effecting relative adjustment between one of said torque sustaining rings and said roller to vary the relative rotation between said torque sustaining rings.

3. In a variable speed transmission the combination of a roller revolvable in planetary fashion about an axis, three rings concentric with said axis and in rolling engagement with said roller at axially spaced points thereon to position the same, means for effecting relative adjustment between one of said rings and roller to develop pressure contact between said roller and rings, and means for effecting relative adjustment between one of said rings and roller to vary the speed ratio of the transmission.

4. In a variable speed transmission the combination of a roller revolvable in planetary fashion about an axis, three rings concentric with said axis and in rolling engagement with said roller at axially spaced points thereon to position the same, means for retaining one of said rings against rotating and for effecting relative adjustment between it and said roller to regulate the planetary action of said roller, and means for effecting relative adjustment between another of said rings and roller to develop pressure contact between said roller and rings.

5. In a variable speed transmission the combination of a roller revolvable in planetary fashion about an axis, two torque sustaining rings and a third ring all concentrically disposed with respect to said axis and all in rolling engagement with said roller at axially spaced points thereon to position the same, means for effecting relative adjustment between one of said torque sustaining rings and said roller to vary the planetary action thereof, and means for effecting relative adjustment between another of said rings and said roller to develop pressure contact between said roller and rings.

6. In a variable speed transmission the combination of a plurality of rollers revolvable in planetary fashion about a central axis, two torque sustaining rings and a third ring all concentrically disposed relative to said axis and all in rolling engagement with said rollers at axially spaced points thereon to position the same, means for effecting contact pressures between said rollers and rings, said third ring being radially movable to distribute said contact pressures, and one of said rings being adjustable to vary the planetary action of said rollers.

7. In a variable speed transmission the combination of a plurality of rollers revolvable in planetary fashion about a central axis, two axially spaced torque sustaining rings in rolling engagement with said rollers, a fulcrum support for said rollers, means coacting with said support and rings for developing contact pressures between said rollers and rings, said fulcrum support being radially yieldable to distribute said pressures, and means for effecting relative adjustment between said rollers and one of said rings to vary the planetary action of said rollers.

8. In a variable speed transmission the combination of a drive shaft, a plurality of planet rollers, means for causing said rollers to rotate with said shaft, two torque sustaining rings in rolling engagement with said rollers, means on said shaft providing a fulcrum for said rollers, and means coacting with said fulcrum means and rings for developing pressure contact between said rollers and rings, said shaft being radially yieldable and cooperating with said fulcrum means to distribute said contact pressures.

9. In a variable speed transmission the combination of a plurality of rollers revolvable in planetary fashion about a central axis, two torque sustaining rings in rolling engagement with said rollers, one of said rings being rotatable relative to the other, means providing a fulcrum support for said rollers, resilient means coacting with said fulcrum means and rings for producing contact pressures between said rollers and rings, and means for effecting relative adjustment between said rollers and one of said rings to vary the relative rotation between said rings.

10. In a variable speed transmission the combination of a plurality of elongated planet rollers, two axially spaced torque sustaining rings in rolling engagement therewith, one of said rings being rotatable relative to the other, means providing a fulcrum support for said rollers, and manually adjustable means coacting with said fulcrum means and rings to produce and regulate contact pressures between said rollers and rings.

11. In a variable speed transmission the combination of a plurality of planet rollers, two exially spaced torque sustaining rings in rolling engagement therewith, one of said rings being rotatable relative to the other, a third ring in rolling engagement with said rollers to provide a fulcrum support therefor, means coacting with said third ring and said torque sustaining rings to produce contact pressures between said rollers and rings, and means on said rollers coacting with said third ring to restrain the rollers against lengthwise movement relative to each other.

ALFRED G. BADE.